United States Patent [19]
Roll et al.

[11] Patent Number: 5,324,102
[45] Date of Patent: Jun. 28, 1994

[54] METHOD AND APPARATUS FOR REGULATING THE BRAKING FORCE OF MOTORCYCLES

[75] Inventors: Georg Roll, Heusenstamm; Heinz F. Ohm, Weiterstadt; Berthold Hauser, Jakobsneuharting, all of Fed. Rep. of Germany

[73] Assignee: FAG Kugelfischer Georg Schafer KGaA, Fed. Rep. of Germany

[21] Appl. No.: 962,890

[22] Filed: Oct. 19, 1992

[30] Foreign Application Priority Data

Oct. 18, 1991 [DE] Fed. Rep. of Germany ....... 4134625

[51] Int. Cl.$^5$ .......................... B60T 8/32; B60T 8/42; B60T 8/24
[52] U.S. Cl. .................................... 303/100; 303/9.60; 303/9.64
[58] Field of Search ...................... 303/100, 9.64, 113.1, 303/113.5, 92, 104, 105, 93

[56] References Cited
U.S. PATENT DOCUMENTS

| | | | |
|---|---|---|---|
| 4,035,032 | 7/1977 | Bertolasi | 303/92 |
| 4,494,800 | 1/1985 | Hayashi | 303/9.64 |
| 4,626,038 | 12/1986 | Hayashi et al. | 303/9.64 |
| 4,626,042 | 12/1986 | Burckhardt | 303/9.64 |
| 4,989,922 | 2/1991 | Pickenhahn et al. | 303/100 |
| 5,005,916 | 4/1991 | Fujioka et al. | 303/111 |
| 5,199,770 | 4/1993 | Yoshino et al. | 188/1.11 |

FOREIGN PATENT DOCUMENTS 3706397 9/1988 Fed. Rep. of Germany ..... 303/9.64

Primary Examiner—Matthew C. Graham
Attorney, Agent, or Firm—Ostrolenk, Faber, Gerb & Soffen

[57] ABSTRACT

In a method for regulating the braking force of motorcycles, the wheel circumferential speed is detected by sensors and evaluated by a microprocessor which gives a signal off to a pressure modulator if given limit values of deceleration are exceeded in positive or negative direction (locking signal) and if, within a predetermined period of time, a signal which symbolizes ground adherence of the rear wheel does not occur (lift-off signal), whereupon the pressure modulator reduces the pressure in the front brake circuit.

12 Claims, 14 Drawing Sheets

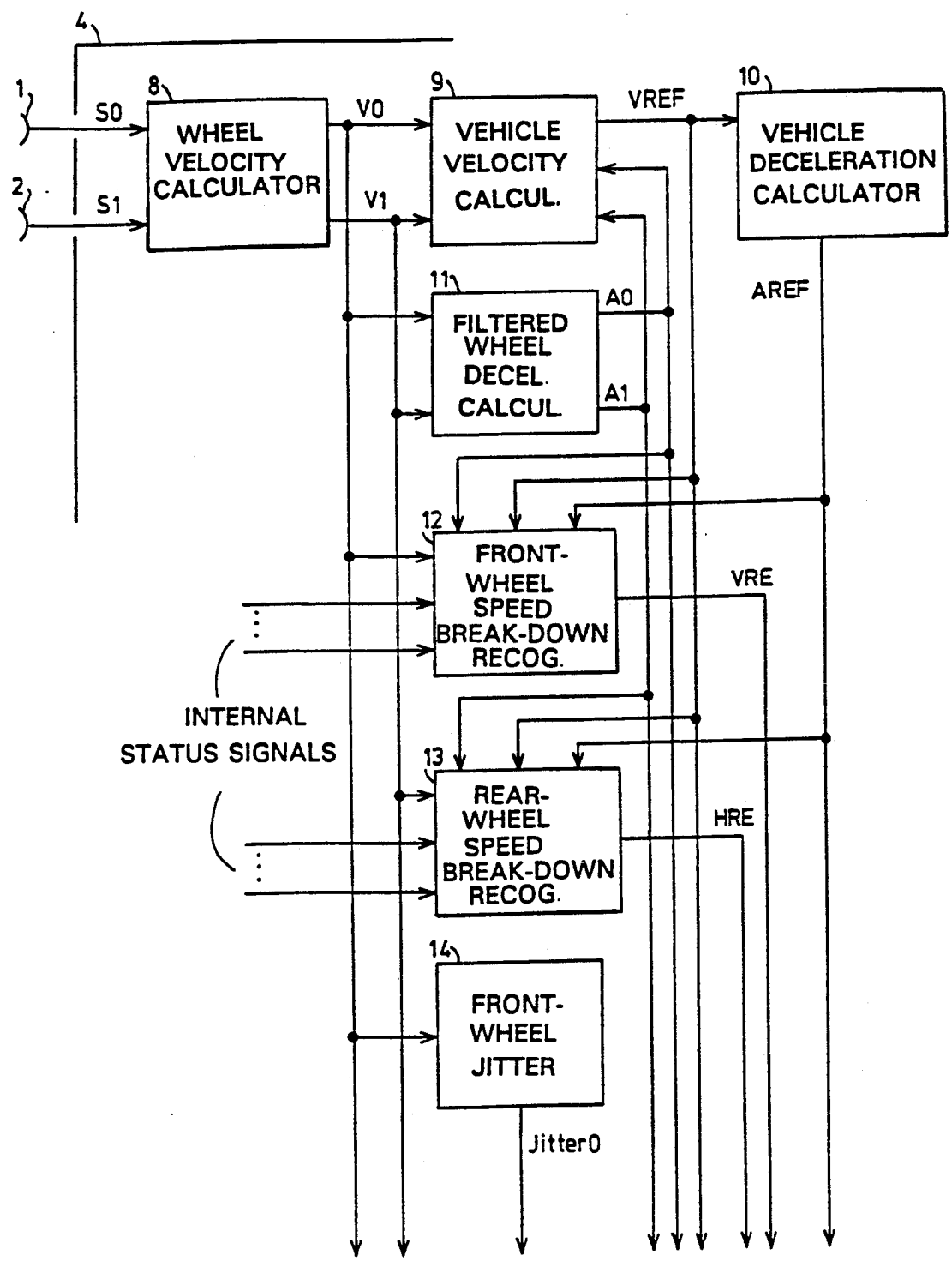
Fig. 5.a

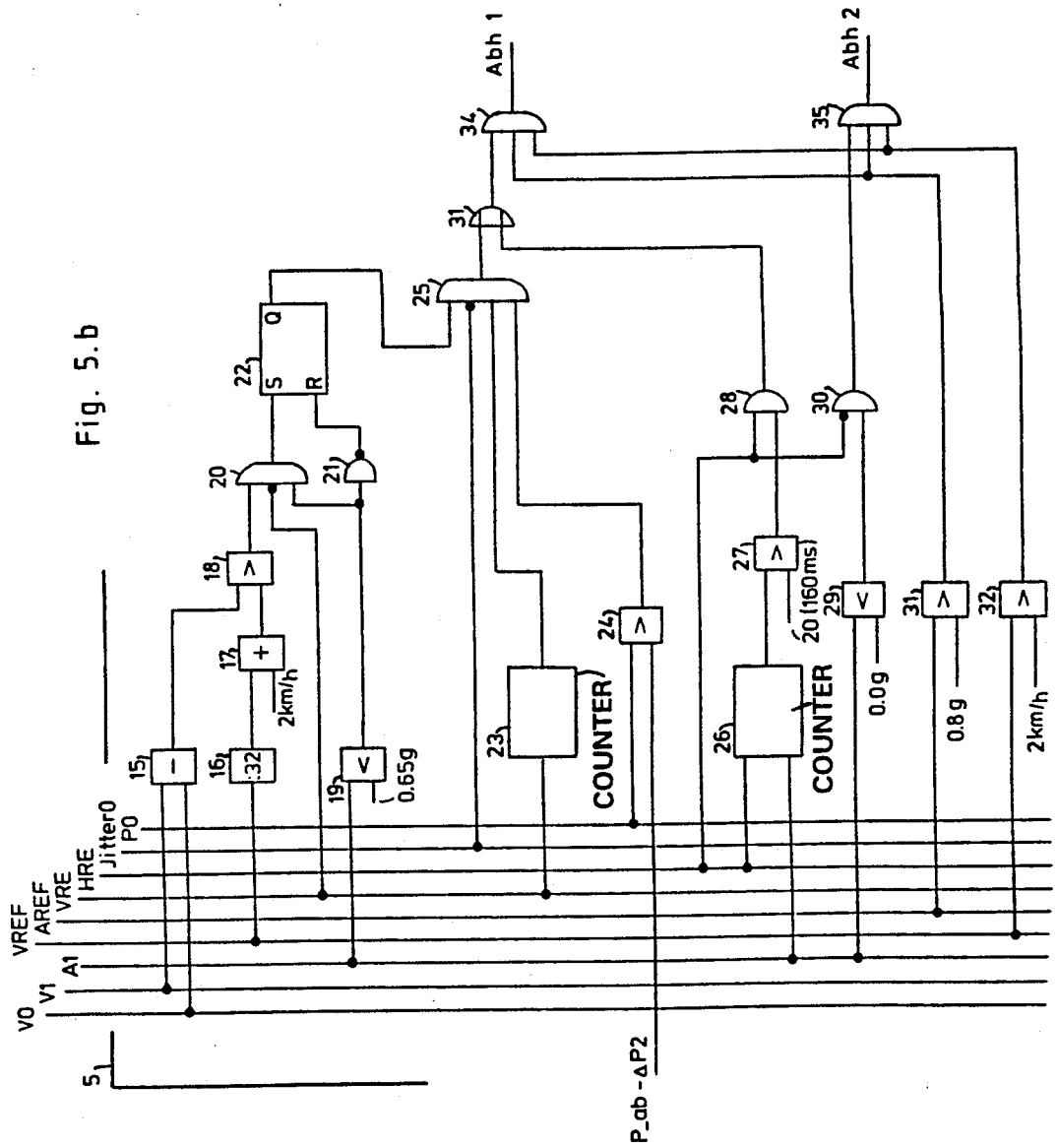
Fig. 5.b

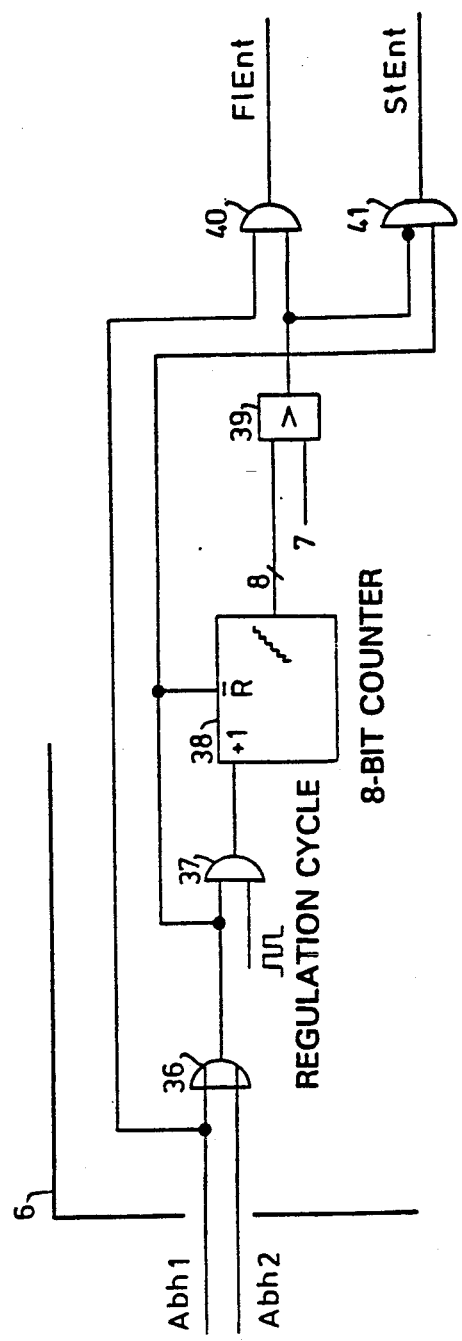

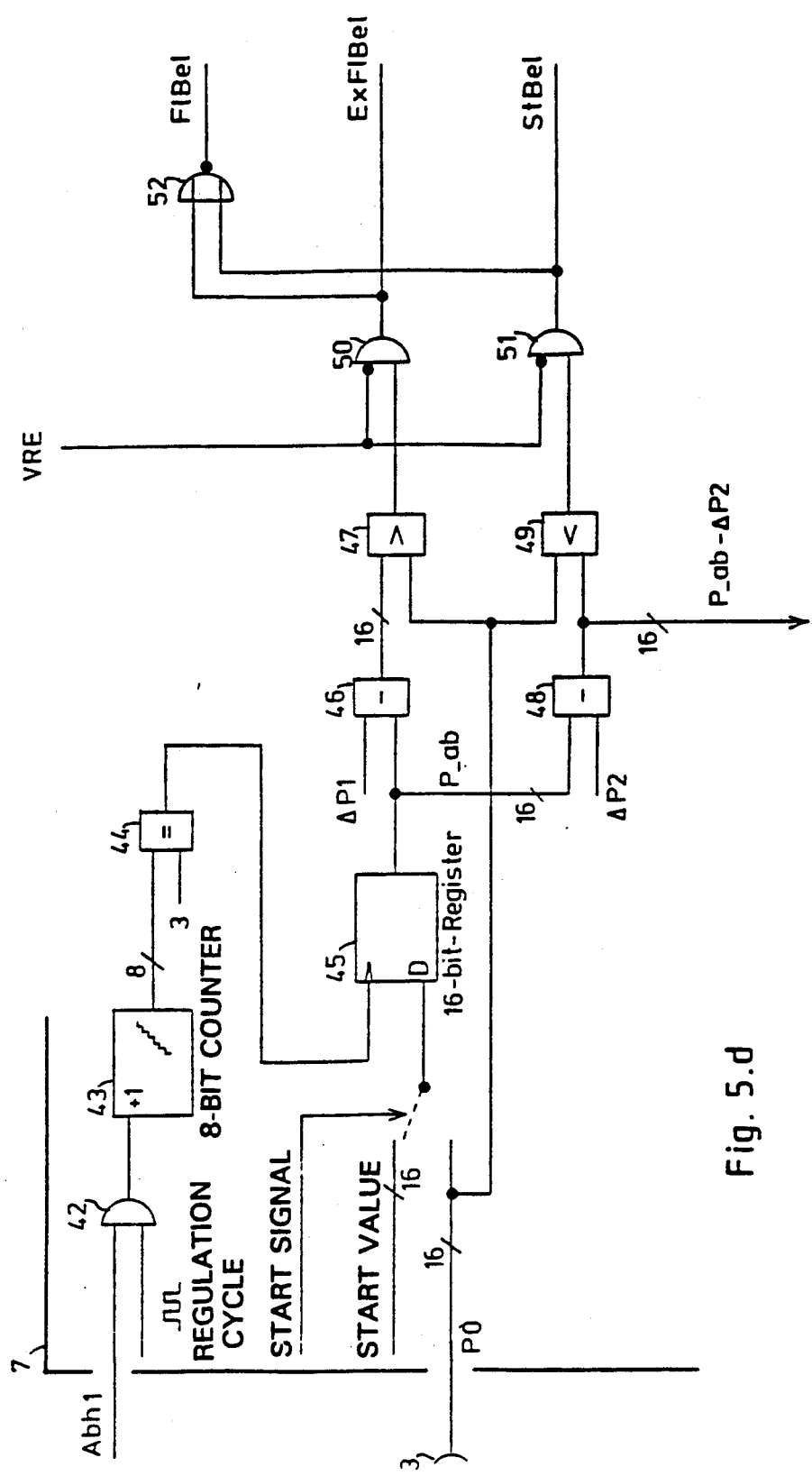
Fig. 5.d

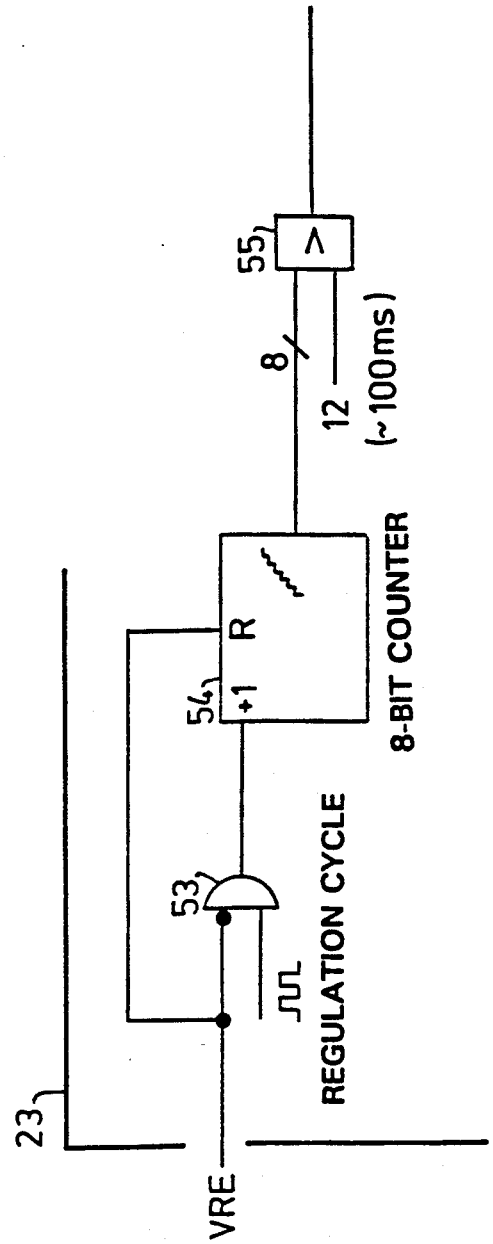
Fig. 5.e

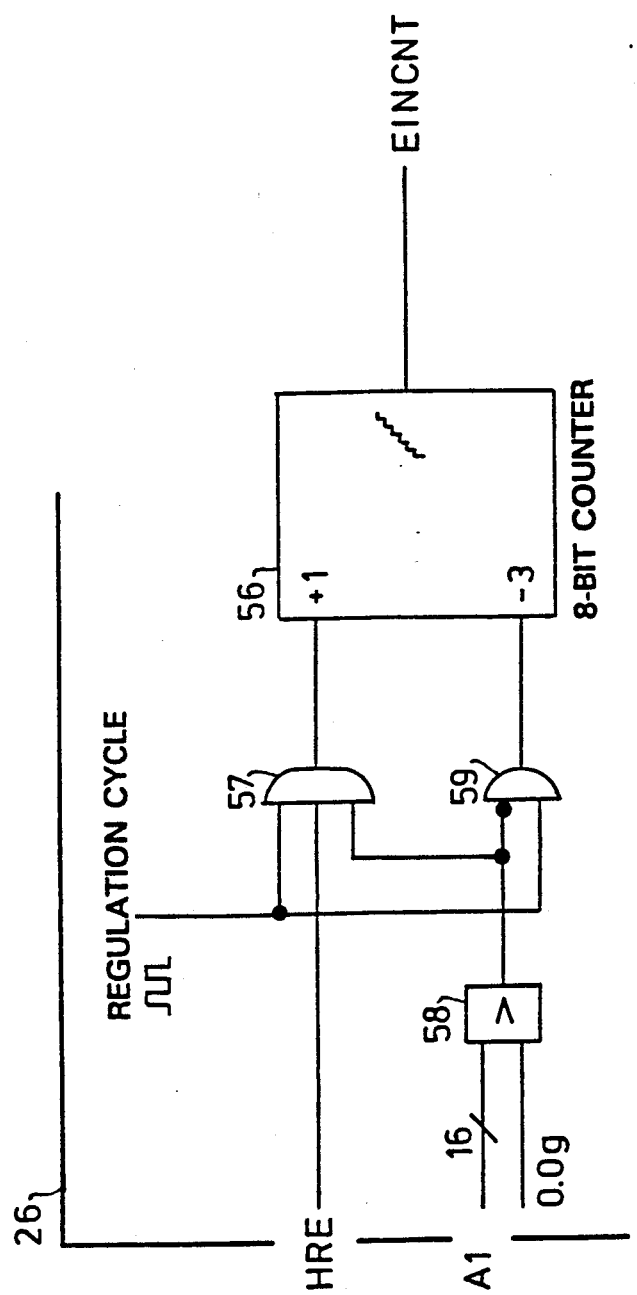
Fig. 5.f

METHOD AND APPARATUS FOR REGULATING THE BRAKING FORCE OF MOTORCYCLES

BACKGROUND OF THE INVENTION

The present invention relates to a method and an apparatus for regulating the braking force of motorcycles.

From Federal Republic of Germany OS 35 30 280 a method is known for the anti-lock braking of a motor vehicle. In that case, by the change in the volume of a three-dimensionally closed system, for instance by displacement of a pressure-relief piston, the brake pressure in the wheel cylinder of the overbraked wheel which tends towards locking is reduced.

Upon extreme braking decelerations two-wheel vehicles tend to lift up at the rear since the entire weight of the vehicle is shifted to the front wheel. By the loss of the ground contact force and thus all lateral guidance forces, the rear wheel is no longer able to impart sufficient stability in direction to the braked vehicle. In extreme cases, the center of gravity can be shifted upward and forward by a slight tipping of the vehicle around the front axle, whereby even greater tipping is induced, which, in its turn, results in an even more unfavorable shifting of the center of gravity. This self-excitation effect has the result that a vehicle which is in danger of lifting off can, within a short period of time, rise by a large angle of tip (greater than 45°) and suddenly be no longer capable of being controlled by the driver. In addition to this, the strong deceleration of the vehicle which can cause excessive tipping occurs predominantly in a dangerous situation which generally already requires the entire concentration of the driver.

The danger of the vehicle lifting off is further increased by new tire characteristics, the $\mu$-slip curve of which achieve a pronounced maximum, and by anti-lock systems which continuously utilize the maximum slip curve.

From Federal Republic of Germany OS 21 33 547 a braking force control for motor vehicles is known in which an additional logical coupling is provided which lowers the pressure on the front-wheel brakes if a signal indicating ground adherence of the rear wheels no longer occurs within a given waiting period.

Such a regulation of the braking force is perhaps suitable for utility vehicles since, due to their great weight, a considerable time is available in order to recognize the danger of the lifting off of the rear axle and counteract it.

Furthermore, four-wheel motor vehicles have only one brake system; in other words, upon actuation, the front axle and the rear axle are braked simultaneously. If the brake is actuated strongly, which on good gripping ground can lead to a lifting-off of the back of the vehicle, high braking forces are definitely present also on the rear wheels and immediately cause strong locking tendencies and make the lifting off clearly visible merely by observation of the lack of restarting of the rear wheel.

For motorcycles, such a regulating of the braking force, however, is unsuitable since the conditions are much more complicated. On the one hand, the lifting off takes place substantially faster due to the smaller masses while, on the other hand, motorcycles have two brake circuits which are actuatable independently of each other.

It is thus possible to decelerate a vehicle so greatly solely with the front wheel brake that lifting off of the rear occurs while, entirely independently thereof, the rear wheel brake can control the variation of the speed of the rear wheel. In combination with a non-disengaged drive, practically any speeds of the rear wheel can be brought about.

Upon recognition of the lift-off, all relevant wheel speed patterns must as far as possible be clearly recognized, i.e., on the one hand, all cases of lift-off which actually occur during each braking must be reliably recognized, while, on the other hand, lift-off should never be noted if not present, in order to avoid unjustified underbraking.

SUMMARY OF THE INVENTION

The method of the invention does not require any additional electromechanical transmitter or sensors which, for instance, measure the intensity of the springing of the rear wheel and make it available to the regulator, but rather the evaluation of the wheel speed patterns is used to recognize the danger of lift-off.

In order to detect the wheel circumferential speeds, the wheel sensor system known from traditional anti-lock systems and already present on the motorcycle is utilized.

In this connection one can distinguish between the following cases:

a. Unbraked rear wheel or rear wheel driven with acceleration.

An unbraked rear wheel endeavors to retain its speed upon the lifting off of the rear of the motorcycle. Only the friction in its bearings leads to a slight deceleration of the circumferential speed of the wheel. In this connection, one first of all proceeds from the basis that the drive of the vehicle is disengaged so that no acceleration or deceleration caused by the engine can occur. The speed of the unbraked rear wheel is increasingly greater than the speed of the front wheel. After a short time, therefore, there is a difference in speed $\Delta V = V1 - V0$ as well as a divergence in acceleration $\Delta A = dV1/dt - dV0/dt$ which can be interpreted as lift-off in connection with a large deceleration of the vehicle (for instance $> 0.8$ g).

If the acceleration of the rear wheel and the divergence in speed detected thereby are caused by the non-disengaged engine drive, then the measure of reducing the pressure on the front wheel is nevertheless adapted to produce more ground-contact force on the rear wheel.

b. Braked rear wheel or rear wheel driven with deceleration.

A braked wheel which has too little (or no) adherence to the ground exhibits a strong tendency towards locking. Even if the brake pressure is reduced to 0 by the anti-lock braking system (ABS), the wheel does not "recover," or does so only after a long time. With a large deceleration of the vehicle (for instance $> 0.9$ g), one must, however, proceed on the basis of a large frictional value between tire and pavement and accordingly expect a clear acceleration of the wheel upon corresponding release from load. If this does not take place, one can proceed from the basis of a wheel with little ground-contact force. The front wheel brake pressure must accordingly be reduced until rear wheel control is possible.

If an engaged motor should be the cause of the non-controllable speed break-down of the rear wheel, the measure of relief of the front wheel is also proper since the ground-contact force on the rear wheel is clearly too little for the existing state of operation. An increase in the ground-contact force which leads to control of the break-down of the rear wheel and improved stability of the vehicle, can only be brought about by reduced deceleration of the vehicle and therefore by relief of the pressure on the front wheel.

c. Limit cases.

There are various limit cases which result in speed patterns which are less clear then in a) and b) and therefore are more difficult to handle.

Thus, the case can occur that a braked rear wheel which has already lifted off is relieved from pressure by the ABS controller so that the speed of the wheel increases up into the region of the calculated reference speed of the vehicle.

The ABS controller then notes that the wheel is again in an acceptable slip and may be again placed under load. Normally, no lifting off of the wheel would now be noted either since the speed break-down could be regulated out. Technically, however, the wheel is in a "state of suspension" in which the speed happens, for a short time, to be in the correct value range. Without subsequent build-up of pressure the speed of the wheel would, after a short time, diverge in an upward direction and case a) could be noted. With a build-up of pressure, the speed of the wheel would immediately break-down again so that case b) would be visible. In both cases, however, there would be an avoidable delay in the reaction. The fact that a lift-off is present can actually be recognized considerably earlier. For this purpose, one must establish the requirement that a wheel must be adapted to be accelerated in all cases strongly by a reduction of pressure in case of a good coefficient of friction. If no defined wheel maximum speed occurs also in the control case, one must proceed from the basis of lack of contact of the wheel with the ground.

Therefore, generally, at the end of an ABS control phase a sufficiently large wheel acceleration must occur on the rear wheel in order that a case of lift-off can be excluded.

Other features and advantages of the present invention will become apparent from the following detailed description of the invention which refers to the accompanying drawings.

BRIEF DESCRIPTION OF THE DRAWINGS

FIGS. 5, 5a, 5b, 5c, 5d, 5e, 5f are block diagrams of a control system for realizing the lift-off recognition and control mechanism.

DETAILED DESCRIPTION OF THE INVENTION

Figure 1:
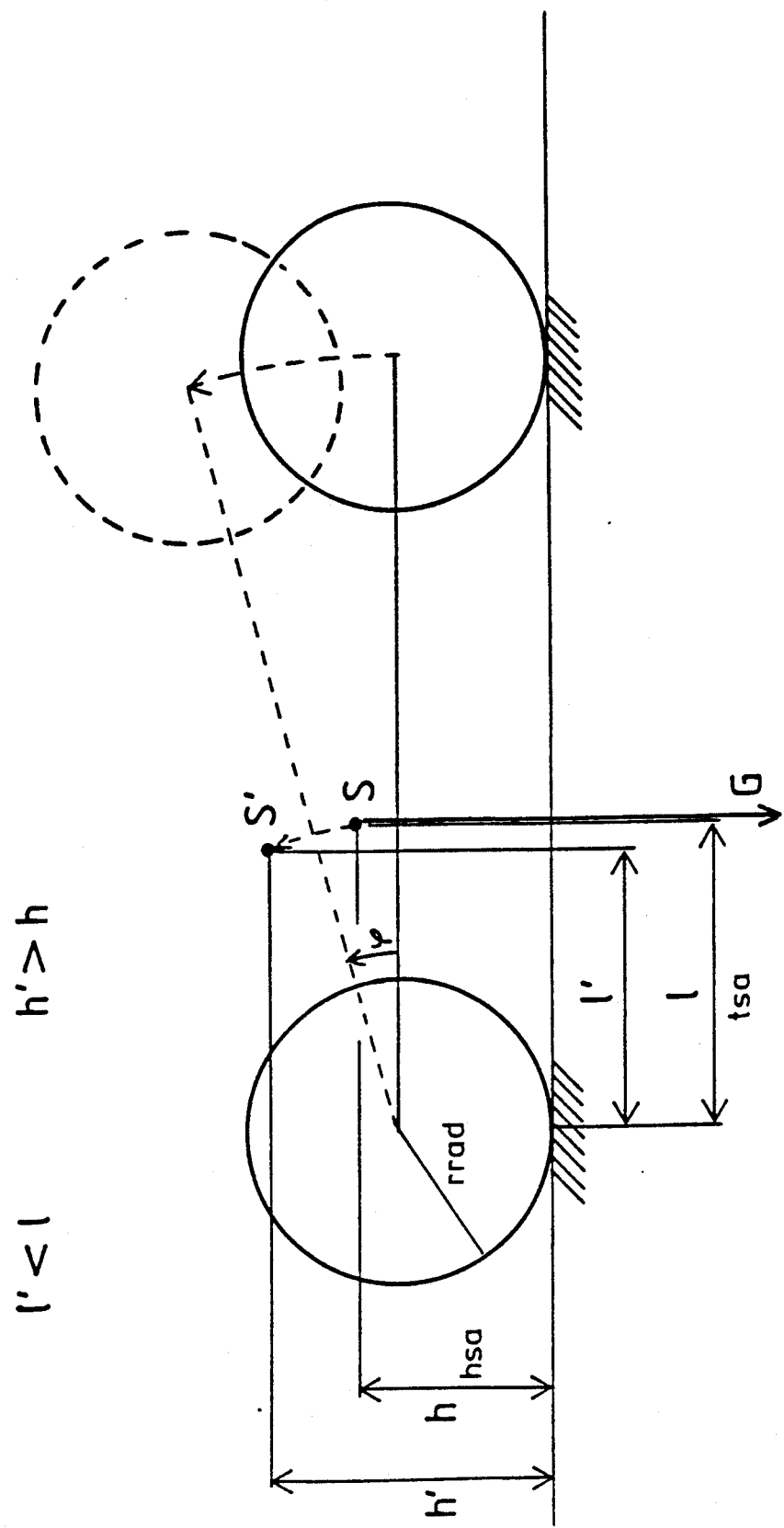
FIG. 1 shows diagrammatically the displacement of the center of gravity in the case of a two-wheel vehicle which lifts off at the rear wheel due to high braking deceleration.

In FIG. 1 the total weight of the motorcycle, which is designated G, acts at the center of gravity S. S' is the shifted center of gravity when, upon the lifting-off of the rear wheel (shown in dashed line), the imaginary connecting line swings by the angle of tip phi. The radius of the front wheel is designated rrad.

As has already been mentioned, the tipping of a vehicle which is in danger of lifting off can, as a result of the self-excitation effect, take place within a very short period of time.

In order to determine the tipping of the vehicle numerically, the following motion equation can be used which describes the turning of the vehicle around the axle of the front wheel. In this connection, for purposes of simplification, one will take as basis a vehicle without spring suspension.

$$DDPHIA=(M*((HSA-RRAD)*A-TSA*G)+BRAKEK*PO)/THETA$$

Herein:
DDPHIA = The second derivative of the angle of tip referred to the axle of the front wheel
M = total mass of the motorcycle
G = total weight of the motorcycle
HSA = height of the center of gravity of the vehicle above the contact point of the front wheel
TSA = horizontal distance of the center of gravity of the vehicle from the point of contact of the front wheel
RRAD = radius of the front wheel
A = deceleration of the center of gravity of the vehicle in horizontal direction
BRAKEK = brake constant which establishes a relationship between the brake pressure of the front wheel and the braking force of the front wheel.
PO = front wheel brake pressure
THETA = moment of mass inertia of the motorcycle with respect to the rotation around the front axle.

On the basis of this equation, the lifting-off process can be simulated with the assumption of certain vehicle data, the brake pressure being continuously increased with time.

Figure 2:
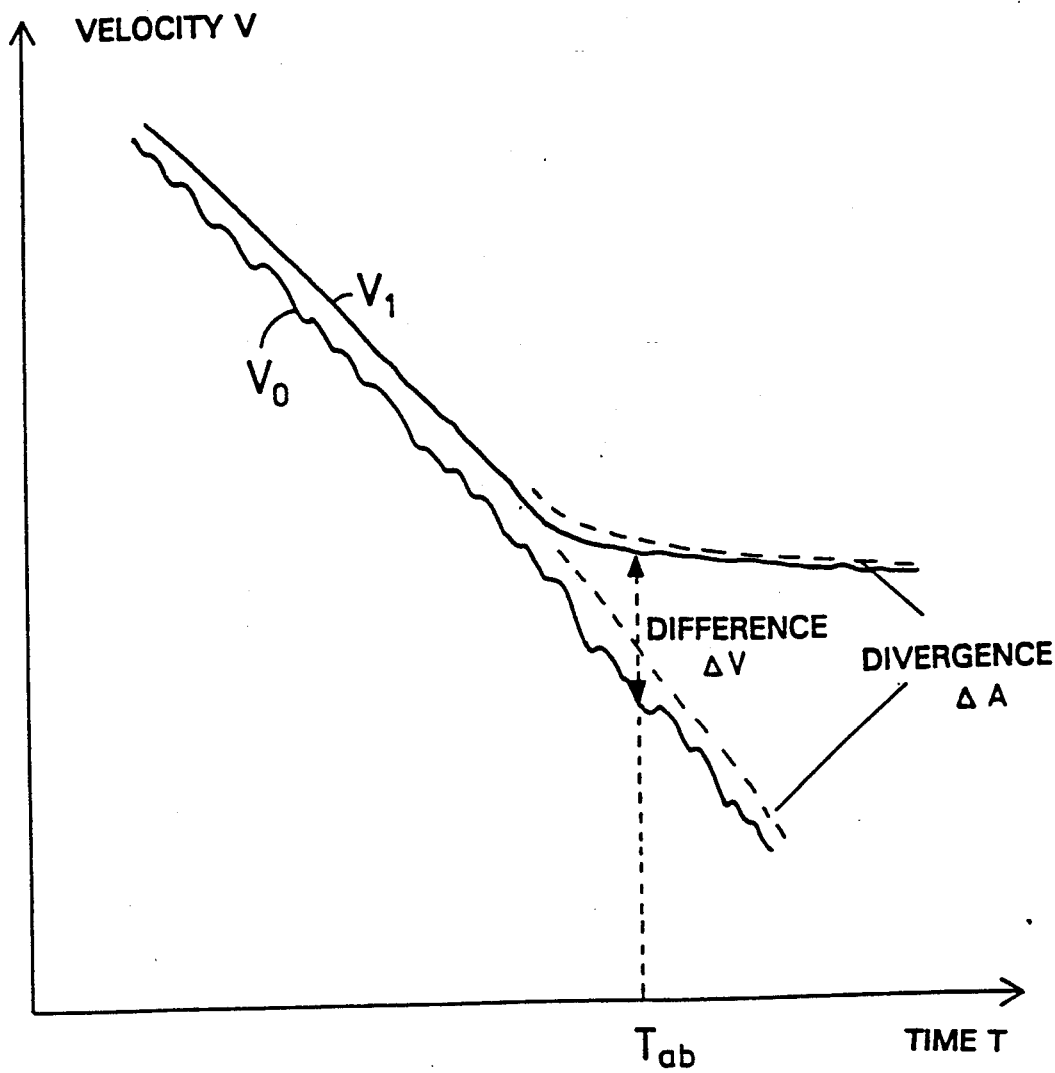
FIG. 2 is a wheel-speed pattern which indicates a rear wheel which is lifting off, which is traveling unbraked.
Figure 3:
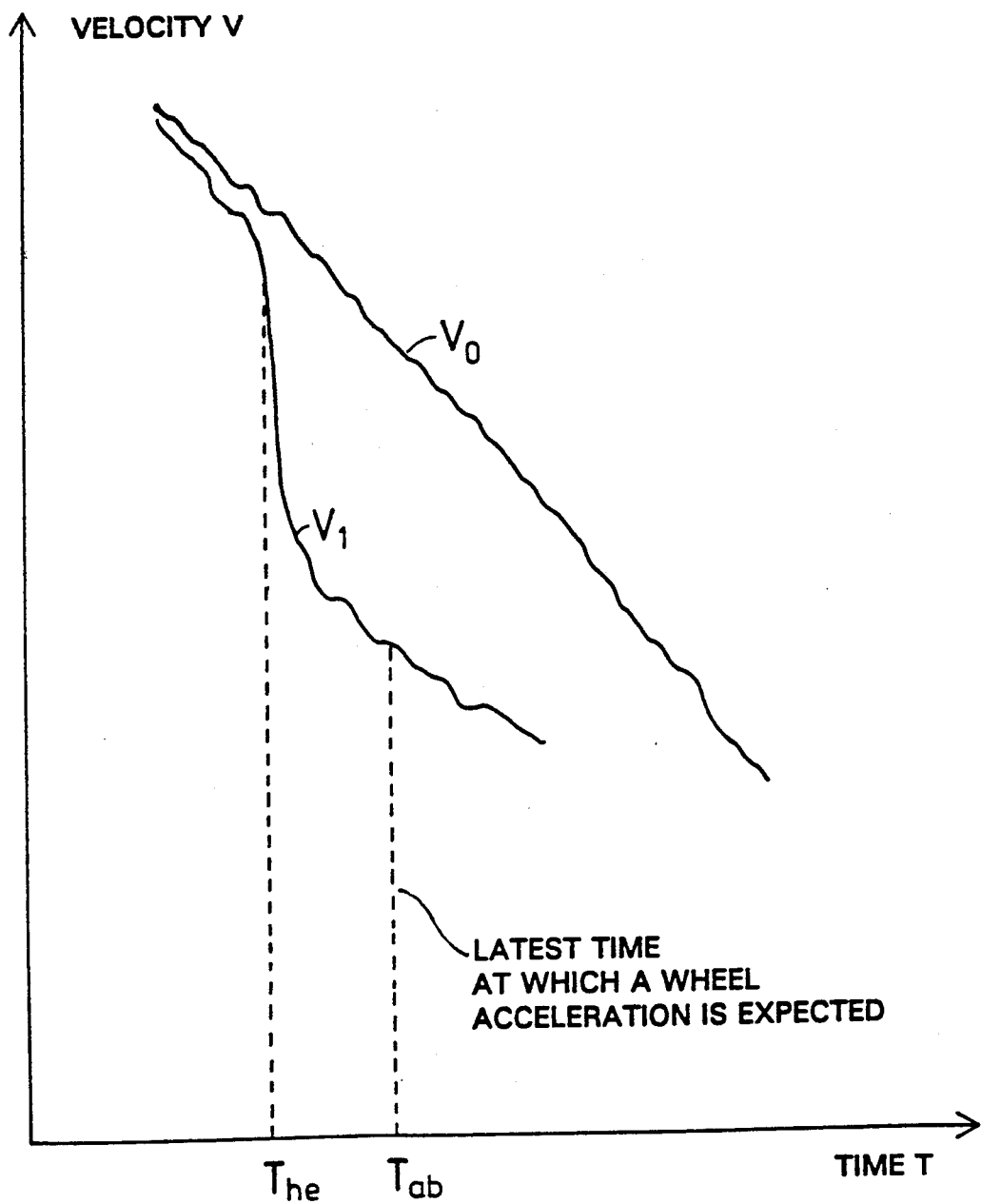
FIG. 3 shows a wheel-speed pattern which indicates a rear wheel which is lifting-off, which is traveling with braking pressure or motor engaged.
Figure 4:
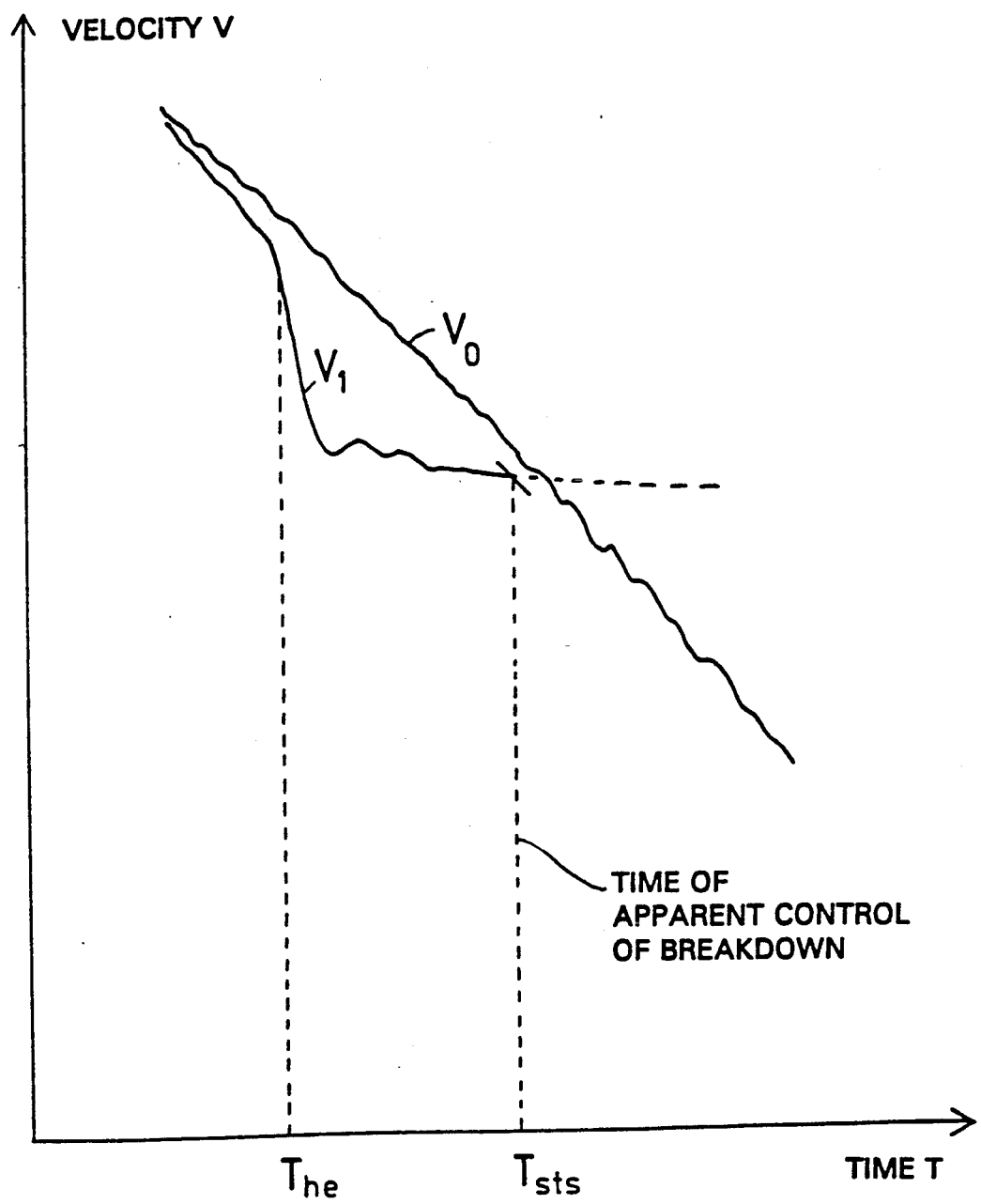
FIG. 4 shows a wheel-speed pattern which indicates a rear wheel which is lifting off, which, with braking pressure or engine engaged, happens to enter into a stable slip.

FIGS. 2, 3 and 4 show the wheel speed patterns in lift-off cases a, b and c. V0 therein is the instantaneous speed of the front wheel, V1 the instantaneous speed of the rear wheel, and Tab, The and Tsts the time of lift-off, the time of break-down of the rear wheel and the times of entrance into stable slip, respectively.

FIG. 5 and FIGS. 5a to 5f show a block diagram of the anti-lift-off device which monitors, as input variables, the signals of the wheel sensors 1, 2, as well as a pressure signal or pressure-proportional signal 3 which represents the brake pressure of the front wheel.

The variables and constants used have the following meaning:
SO = signal of the inductive front-wheel sensor which permits a determination of the actual circumferential speed of the front wheel;

S1 = signal of the inductive rear-wheel sensor which permits a determination of the actual circumferential speed of the rear wheel;

V0 = instantaneous speed of the front wheel (an ABS controller forms the instantaneous circumferential speed of the wheel from the wheel sensor signals in each control cycle);

V1 = instantaneous speed of the rear wheel

A0 = filtered front-wheel deceleration/acceleration

A1 = filtered rear-wheel deceleration/acceleration

VREF = calculated reference speed of the vehicle (formed from filtered wheel speeds and plausibility considerations)

AREF = filtered vehicle deceleration-derivative with respect to time of VREF (supplies an estimated vehicle deceleration which, to be sure, varies very greatly as a result of the short control cycle times; for this reason, a filtering of this signal is generally effected; AREF is assumed to be such a filtered vehicle deceleration)

VRE = display signal for front-wheel speed breakdown (Boolean 1-bit signal which is set to logical 1 when the front-wheel speed, due to overbraking, enters into too large a slip region, and becomes logical 0 when the actual wheel slip is stable);

HRE = display signal for rear-wheel speed breakdown

Jitter0 = display signal for front-wheel jitter (Boolean 1-bit signal which is at logical 1 when strong jitter is noted on the front wheel or has been shortly determined before)

PO = wheel brake-cylinder pressure on the front wheel (this pressure is adjusted upon the control braking by the ABS controller; the mechanisms indicated here can act directly on PO via the ABS controller). In the case of the concept shown here it is assumed that PO is either detected by a pressure measuring instrument or that, for instance, when using an ABS pressure modulator employing the plunger principle there is a direct relationship between the measurable position of the front-wheel pressure piston and the relative front-wheel brake pressure so that PO can be read as relative variable from the instantaneous position of the piston.

P_ab = front-wheel brake pressure PO at the time of a reliably recognized lifting off of the vehicle $\Delta P1$, $\Delta P2$ = constant (vehicle-specific) pressure values for the forming of the switch waves for the slope of the pressure start after the regulating-out of vehicle lift-off Abh1 = display signal for vehicle lift-off (Boolean 1-bit signal which becomes logical 1 when a case of lift-off in accordance with a) or b) is present)

Abh2 = display signal for vehicle lift-off (Boolean 1-bit signal which becomes logical 1 when a case of lift-off in accordance with c) is present)

StEnt = control signal at the ABS controller: effects a steep relief of pressure on the front wheel FlEnt = control signal at the ABS controller: effects a flat relief of pressure on the front wheel StBel = control signal at the ABS controller: effects a steep reloading of pressure on the front wheel FlBel = control signal at the ABS controller: effects a flat reloading of pressure on the front wheel.

ExFlBel = control signal at the ABS controller: effects an extremely flat reloading of pressure on the front wheel EINCNT = time of a rear-wheel speed break-down Start signal = start pulse for the ABS controller: Boolean 1-bit signal which is set only in the first cycle of each anti-lock system control to logical 1 and in all other cycles to logical 0)

Control cycle time = clock signal which is switched with the duration of an ABS control cycle (in this case, 8 msec) $\leq$ 125 Hz 1 g = acceleration due to gravity = 9.81 m/s$^2$ In this connection, the switch block 4 contains sub-blocks 8–14 (see FIG. 5a) which serve to form internal ABS reference signals. The realization of these blocks can be obtained by different known methods. For a better understanding of the overall concept, however, the functions of the blocks will be briefly described below.

Block 8 calculates corresponding wheel speeds V0 and V1 for both wheels from the wheel sensor signals. From them, block 11 forms filtered wheel decelerations A0 and A1. V0, V1, A0 and A1 serve as input variables for the block 9, which calculates an approximate vehicle reference speed VREF. From VREF, the block 10 produces a filtered vehicle deceleration AREF. Blocks 12 and 13, on the basis of the signals V0, A0, VREF, AREF and V1, A1, VREF, AREF, respectively, and internal status signals determine whether a wheel has been braked with excessive slip and is therefore in danger of locking. If this is true at the front wheel, the block 12 sets the logical signal VRE at 1 (Boolean = true). During the entire control time, VRE remains equal to 1 until the wheel is again in a stable slip region and can again be loaded. Block 13 correspondingly sets the logical signal HRE to 1 when a rear-wheel speed break-down takes place.

The switch block 14 switches a 0 to its output when the front wheel speed V0 shows only slight jitter. Upon, or directly after, the occurrence of strong jitter, block 14 places a 1 on its output.

The switch block 5 (see FIG. 5b) represents the actual lift-off detector. The internal blocks 15 ... 35 check whether one of the wheel-speed patterns described is present.

For this purpose, the subtractor 15 forms the wheel-speed differences V1−V0. The divider 16 and the adder 17 form a threshold value which is dependent on the vehicle speed, namely, VREF/32+2 km/hr. The comparator 18 switches a logical 1 to its output if the rear wheel speed V1 is already clearly above the front wheel speed V0 and therefore the condition V1−V0 > VREF/32+2 km/hr is satisfied. The comparator 19 switches a logical 1 to its output if the rear wheel deceleration is relatively slight (A1 < 0.65 g). If the comparators 18 and 19 both deliver a 1 and no front wheel break-down is present at the same time (and therefore the signal VRE is logical 0), the AND gate 20 gives off a logical 1 and thus sets the RS flip-flop 22. The flip-flop is only reset when the comparator 19 establishes that the filtered rear-wheel deceleration has again become greater than 0.65 g.

In this way, the output signal Q of the flip-flow has an information storage function. When the AND gate 20 has once supplied a 1, this is held fast in the flip-flop as information with regard to the possible recognition of a lift-off until a reset has been brought about by the gate 21, which means, in substance, that the danger of lift-off is definitely no longer present.

In order that this speed pattern may actually be interpreted as indication of lift-off, three additional conditions are checked via the AND gate 25. First of all, the front wheel jitter must be slight and block 14 therefore must deliver an 0, since, in the event of strong wheel jitter, the above speed pattern can very easily occur without a case of lift-off being present.

Secondly, assurance must be had that a prior control of a front-wheel speed break-down caused by overbraking has not occurred within at least about 100 msec since the above speed pattern can occur also in the time following such a control. Furthermore, a lift-off is not to be expected directly after a reduction of the front-wheel pressure if the rear wheel is traveling unbraked. For this purpose, the block 23 with its sub-blocks 53–55 (see FIG. 5e) counts the control cycles which have passed since the previous front-wheel control in the manner that the 8-bit counter 54 is always reset to 0 when the signal VRE is still 1 and therefore the control still takes place, and in case of VRE=0 is incremented by the control cycle. The output of the block 23 is at 1 when the counter has counted more than 12 cycles, which is checked via the comparator 55.

Thirdly, the condition must be satisfied that the front-wheel brake pressure PO reached is already in the vicinity of the previously determined lift-off brake pressure P_ab, and therefore has exceeded the value P_ab−ΔP2, which is also checked by the comparator 24.

Whether the speed pattern detected with the above-mentioned circuit was actually caused by the rear wheel lifting off is finally determined by two further tests. These tests are carried out by means of the comparators 32 and 33. Comparator 32 tests whether the vehicle deceleration determined is above, for instance, 0.8 g (this value is specific to the vehicle), and comparator 33 tests whether the speed of the vehicle is at least 2 km/hr. If both comparators give a logical 1 (event positive) and if the AND gate 22 also sends a 1 over the OR gate 31, a lift-off is suspected.

The AND gate 34 then switches a pressure relief curve generator 6 into active position or instructs the ABS controller to reduce pressure in accordance with a given time function.

The decrease of pressure terminates when the speed pattern permits the definite conclusion that no danger of lift-off is present any longer. This is the case when, in general, there is no deceleration of the vehicle above 0.8 g or the vehicle has already been braked down to below a speed of 2 km/hr or, after a recognized lift-off, a relatively large medium rear-wheel deceleration of more than 0.65 g has been measured, which can be considered an indication that sufficient ground contact is again present.

The second speed pattern which indicates a lift-off situation is detected by the blocks 26–28 with the sub-blocks 56–59.

For this purpose, by means of the counter 56 the time is measured which the ABS algorithm requires in order again to control the rear wheel speed after a break-down caused by overbraking. In the case of very small or completely absent ground contact force of the wheel, the time required becomes correspondingly large since even in the case of local reduction of brake pressure no control is possible. The counter 56, therefore, by its instantaneous position, indicates how probable the case of lift-off is. In order to satisfy this task insofar as possible in all cases the counter reading can also be reduced. This is always done when the filtered rear wheel deceleration A1 becomes negative and therefore a clear acceleration of the wheel is present, which permits the conclusion that there is sufficient ground contact.

In case of slight lift-off and intervening ground contact caused by ground waves, the rear wheel can be decelerated and then accelerated again for a short time. In such cases it is important that the lift-off is not immediately considered controlled upon each point of wheel acceleration.

The counter 56 therefore increments its counter reading by 1 in each ABS cycle in which a rear wheel break-down still is present (in this case, the signal HRE is logical 1) and the filtered rear-wheel deceleration A1 is positive (this is tested by the comparator 58), and the wheel therefore does not accelerate substantially. The AND gate 57 tests these conditions and switches the control cycle clock accordingly to the incrementing input of the counter 56. If A1 becomes negative, the counter reading is decremented via the AND gate 59 by 3 upon each control cycle.

The comparator 27 gives off a logical 1 at its output when the counter reading EINCNT has exceeded a given value (here 20). If, at the same time, the signal HRE is active, then there is momentarily still a rear-wheel break-down and the AND gate 28 indicates, by means of a logical 1 that a speed pattern which indicates a case of lift-off is present. A pressure relief is, however, introduced via the AND gate 34 only if at the same time a high deceleration of the vehicle is present (this excludes the low-μ case in which a rear-wheel control might last for a relatively long time) and the speed of the vehicle is still above 2 km/hr (see above).

The switch circuits 29, 30 serve to detect the limit case. If a rear wheel speed break-down has apparently been controlled so that the HRE signal passes to logical 0 without a clear acceleration of the wheel having taken place previously (recognizable on the filtered acceleration of the rear wheel A1 questioned via the comparator 29 at the end of the control), then the AND gate 30 supplies a logical 1. The AND gate 35 produces a logical 1 if, in addition, a high deceleration of the vehicle is present and the speed of the vehicle is still above 2 km/hr. The AND gate 35 thus brings about a special pressure-relief measure.

After the control of a case of lift-off, the great pressure on the front wheel must be brought as rapidly as possible again to a high value without a further lift off being thereby brought about. In accordance with the present concept, the switch block 7 having the sub-blocks 42–52 generates a suitable reloading function and imparts the ABS controller corresponding control signals for the corresponding slope of the pressure start.

Whenever a definite lift-off (Abh=1 for 3 control cycles) is present, the 16-bit register 45 is caused to store the actual pressure value PO (which led to the lift-off) as P_ab. The fact that 3 lift-off control cycles have already taken place is determined via the AND gate 42, the counter 43 and the comparator 44, which then switches a logical 1 to the control input of the register if the counter reading is 3. At the start of an ABS control (start signal=1 in the first control cycle) a very high start pressure value is stored as P_ab.

After a controlled lift-off the value of P_ab serves as reference pressure. From the difference of the front-wheel brake pressure reached in each case and the reference pressure P_ab, the slope of the start of PO is determined.

This takes place in the manner that the subtractor 48 deducts a large amount ΔP2 from P_ab. If PO is still below this value, the 16-bit comparator 49 supplies a 1 and, via the AND gate 51, switches the signal StBel to 1, so that the ABS controller is advised that a steep pressure start is still required since the pressure P0 is still far from the lift-off pressure point P_ab.

Should PU already be very close below or above P_ab, and therefore P0>P_ab−ΔP1, ΔP1 being a small amount of pressure, then the AND gate 50 switches the signal ExFlBel to 1 and thus causes the anti-lock system controller to effect a very flat pressure start.

If none of the signals StBel and ExFlBel is at 1, then the OR gate (52) switches the signal FlBel to logical 1 so that a normal flat pressure start takes place.

In actual practice it is found that the extremely flat build-up of pressure in the vicinity of the existing lift-off pressure point leads to very good results since, as a result of the extremely slow rise of pressure in the region of the optimal pressure point, the tire can enter into a very high force lock with the surface of the road and, in addition, the vehicle is not imparted a tendency to tip due to the very quiet vibrationless deceleration of the vehicle.

The approaching of a previously noted pressure point is completely unproblematical particularly in the case of ABS systems based on the plunger principle, since there is a direct relationship between the brake pressure and the measurable position of the plunger.

The noting of a pressure point is therefore reduced to noting the position of the pressure piston and the approaching of a noted pressure is obtained by approach of the noted position of the pressure plunger without actual knowledge of the absolute pressures being necessary.

Figure 6:
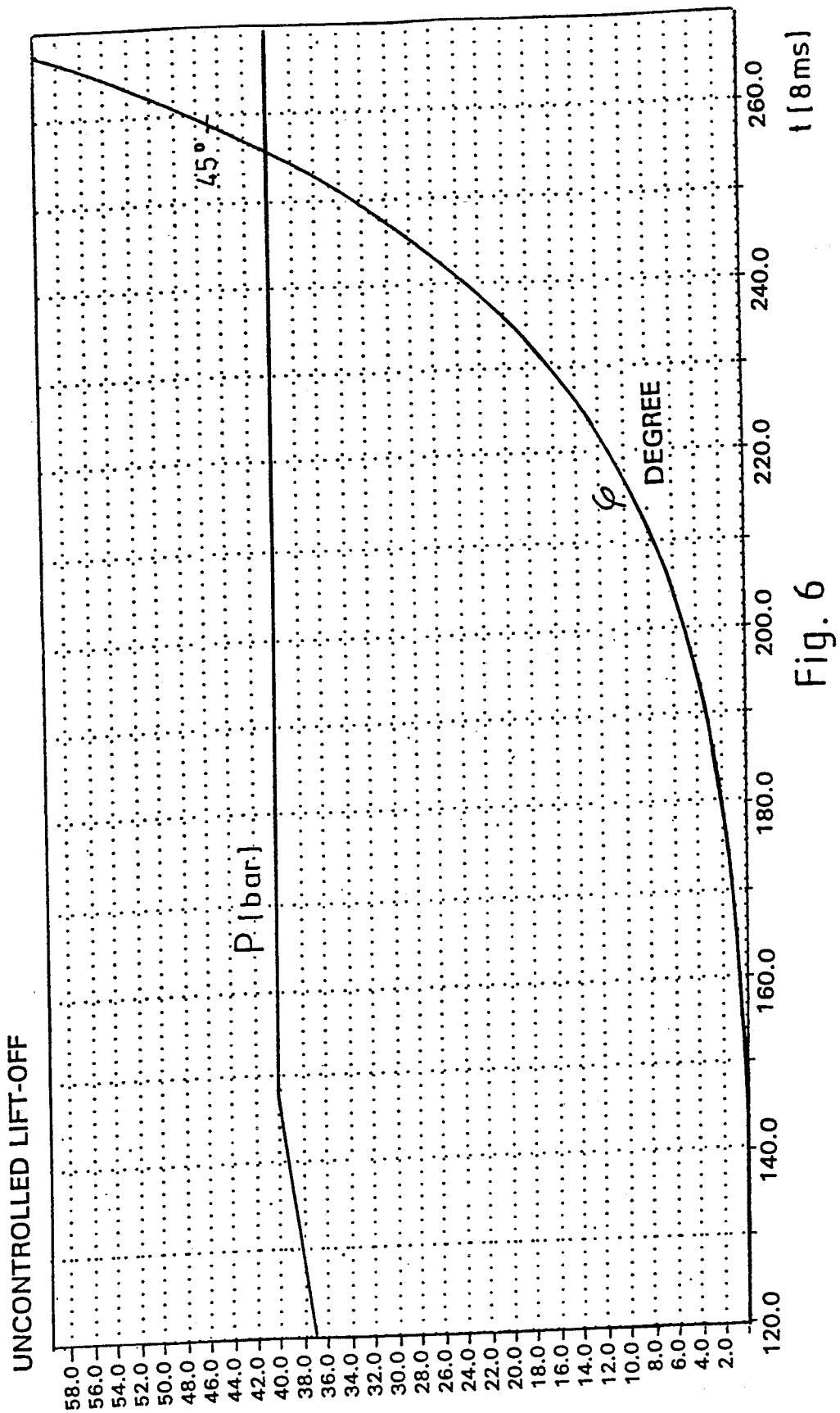
FIG. 6 shows the variation with time of angle of tip and the brake pressure of the front wheel in an uncontrolled lifting off of the vehicle.

The time graph of FIG. 6 shows a case of uncontrolled lift-off. The angular position of the vehicle increases approximately as the square of the time.

In the case of vehicle with spring suspension, the tipping process would take place substantially faster, particularly upon steep pressure approach. In order to avoid larger angles of tip by means of a drive-lift device, a rapidly acting pressure build-up function is therefore also necessary.

Figure 7:
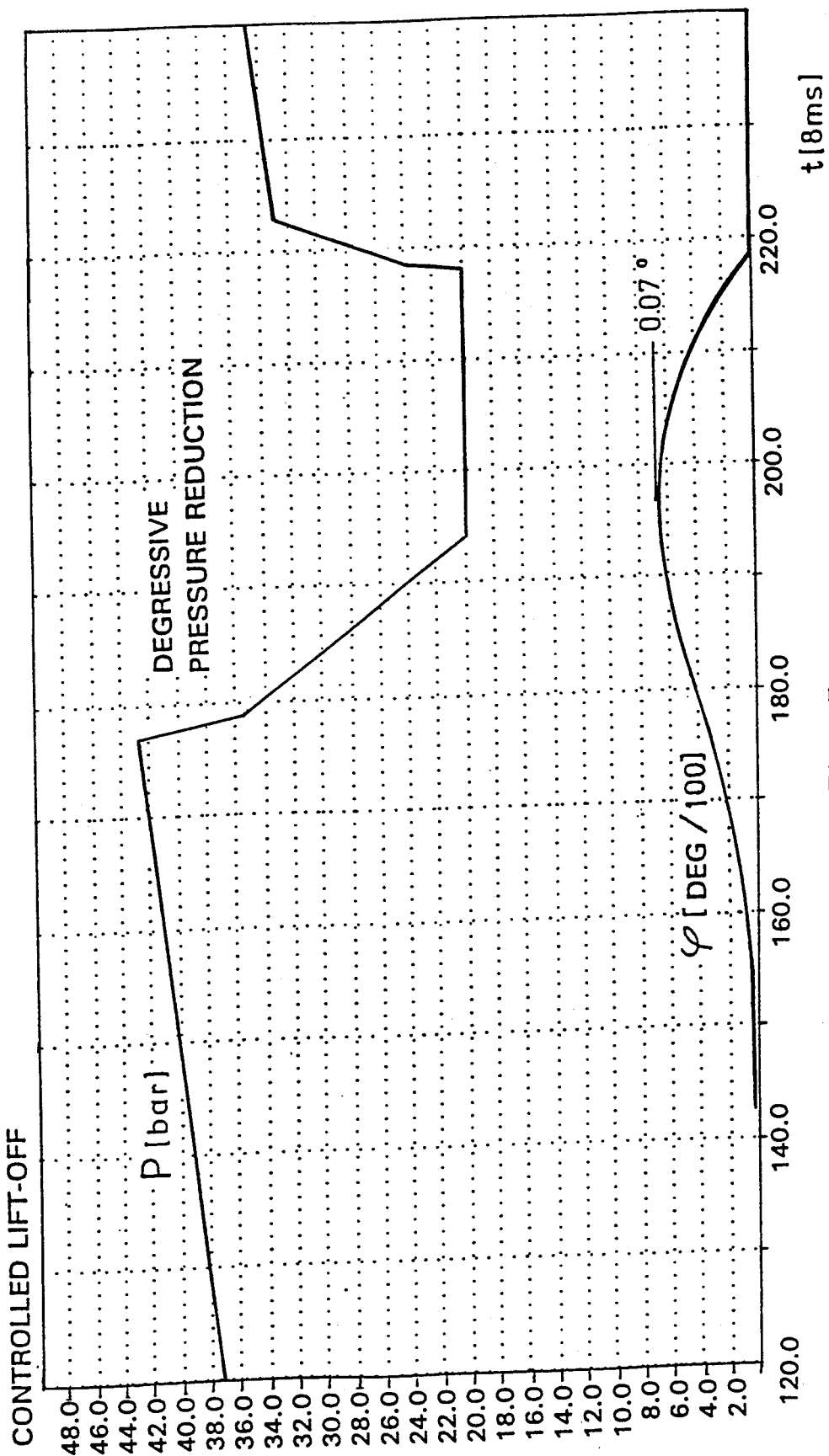
FIG. 7 shows the variation with time of angle of tip and the brake pressure of the front wheel in a controlled lifting off of the vehicle.

FIG. 7, for instance, shows such a control. When the danger of lift-off is eliminated, a pressure build-up is introduced which is initially steep and later flat, similar to the normal pressure build-up after the controlling of a wheel locking.

Figure 5:
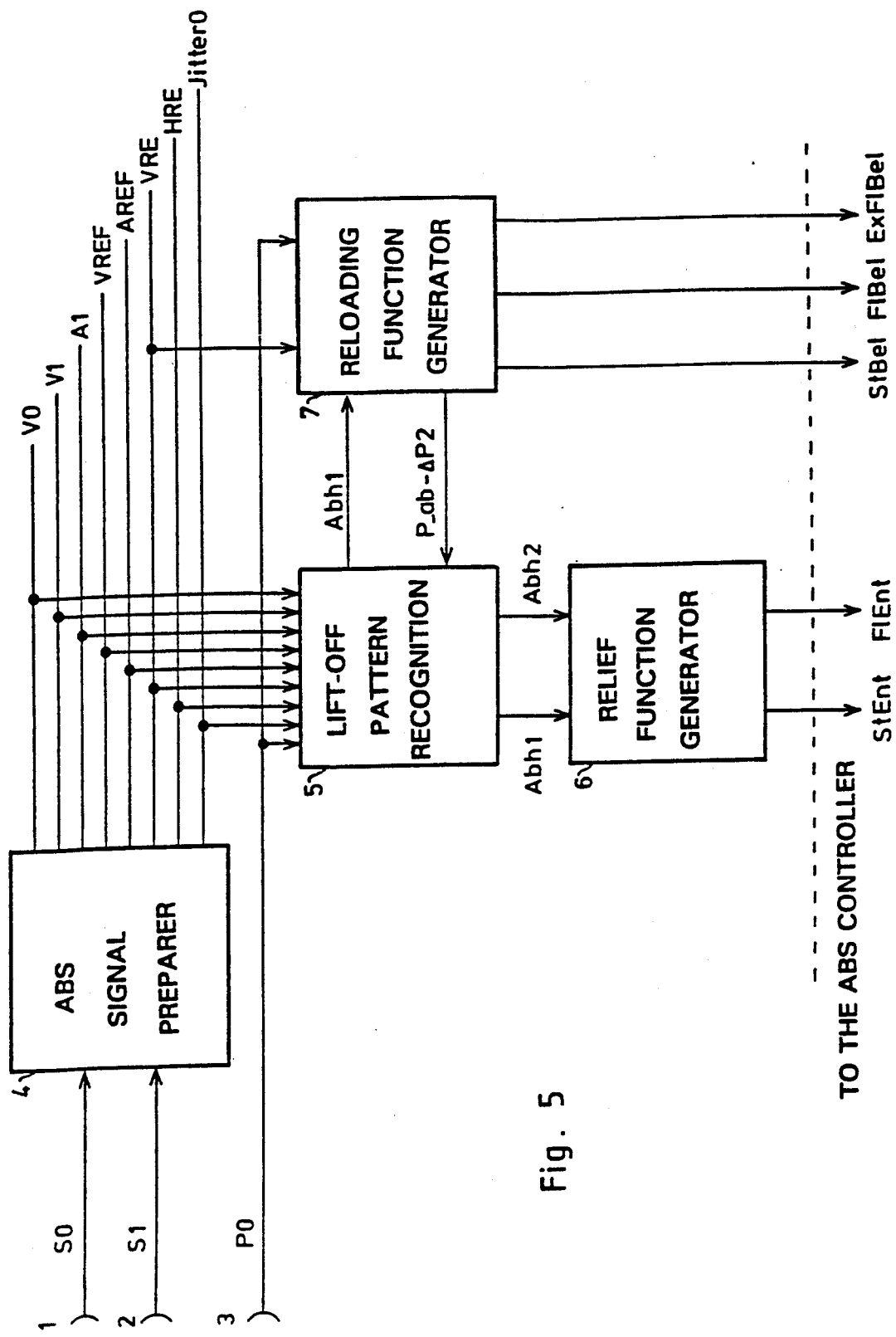

In the switch diagram of FIG. 5, the function block 6 with the sub-blocks 36–41 assumes the task of generating a relief function with time and advising the ABS controller by means of the control signals StEnt and FlEnt whether a steep relief of the front-wheel pressure (StEnt=1) or a flat relief (FlEnt=1) is to take place.

For this purpose, the 8-bit counter 38 is always set to 0 when no case of lift-off is recognized and the OR gate 36 therefore gives off an 0. As soon as a case of lift-off is indicated by Abh1=1 or Abh2=1, the counter is incremented with the control cycle time via the AND gate 37.

The 8-bit comparator 39 applies a logical 0 to its output as long as the reading of the counter is still smaller than or equal to 7, so that the signal StEnt is set via the AND gate 41 to logical 1, which indicates to the ABS controller during the first 7 relief cycles that a strong relief is to be effected.

When the counter reading exceeds a value of 7 and a case of lift-off in accordance with one of the patterns described in a) or b) is present (Abh1=1), the AND gate 40 switches the signal for the flat relief FlEnt to 1. Thus, in the case of the lift-off pattern according to c) (Abh2=1), only the steep relief of the first 7 cycles is carried out, without a lift-off condition for this measure being required, while for Abh1=1 an initially steep and then flat relief takes place until the causative speed pattern is no longer present.

Figure 8:
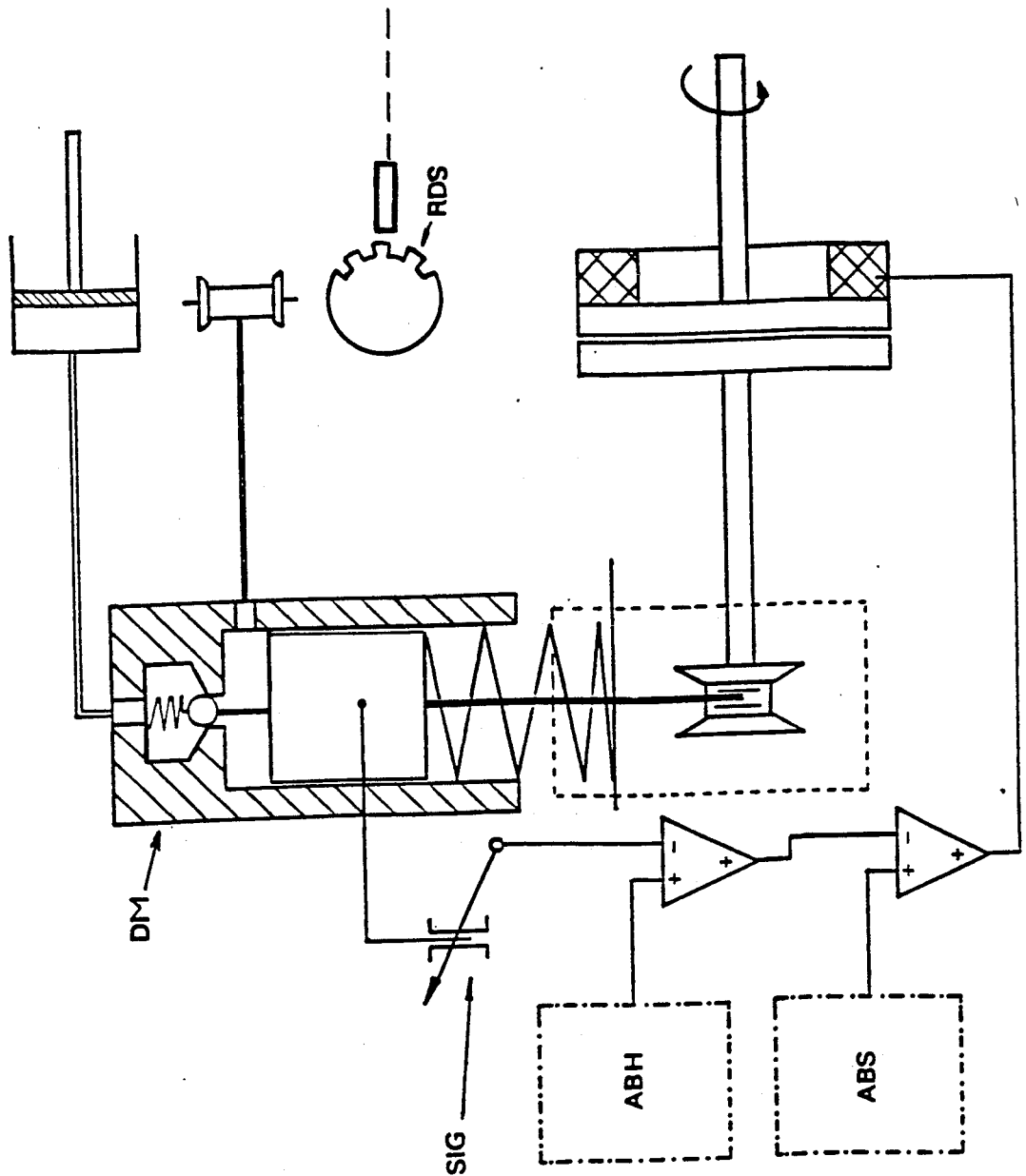
FIG. 8 shows diagrammatically apparatus in accordance with the invention.

FIG. 8 diagrammatically shows a device in accordance with the invention. It consists essentially of wheel rotation sensors RDS, microprocessors ABH and ABS, pressure modulators DM, and signal transmitters SIG. The manner of operation of the pressure modulator corresponds essentially to what has been described in the aforementioned Federal Republic of Germany OS 35 30 280 so that it need not be taken up in further detail here. There is the new feature here that the pressure modulator DM of the front-wheel brake circuit can be actuated not only by the locking signals ABS but also by the lift-off signals ABH. In this connection it is advantageous that the position of the pressure relief piston can be converted via the signal SIG directly into the value of the front-wheel brake pressure.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of regulating the braking force of a motorcycle having front and rear wheels with respective front and rear brakes, which comprises:
   (a) sensing the circumferential speeds of the front and rear wheels;
   (b) applying a braking force to the front brakes or to both the front and rear brakes to decelerate the motorcycle;
   (c) determining from the circumferential speeds of the front and rear wheels the speed of the front wheel, the speed of the rear wheel and the deceleration of the motorcycle;
   (d) generating a first control signal if the deceleration of the motorcycle exceeds predetermined limits thereof;
   (e) reducing the braking force applied to the front brakes if the first control signal is generated;
   (f) determining from the speeds of the front and rear wheels whether the rear wheel has lost contact with the ground;
   (g) generating a second control signal if, after a predetermined time from initiation of step (b), the rear wheel has lost contact to the ground; and
   (h) reducing the braking force applied to the front brakes if the second control signal is generated.

2. A method of regulating the braking force of a motorcycle in accordance with claim 2, which, if a braking force is applied to the rear brakes, includes determining whether the slip of the rear wheel has exceeded a predetermined limit, and wherein the rear wheel is determined to have lost adherence to the ground if any of the following conditions occur:
   (i) the deceleration of the motorcycle exceeds a predetermined maximum amount, and the speed of the rear wheel is greater by a minimum amount than the speed of the front wheel and, with no braking force applied to the brakes of the rear wheel, the deceleration of the rear wheel is less than a minimum amount; or (ii) the deceleration of the motorcycle exceeds a maximum amount and, with a braking force applied to the rear brakes, the slip of the rear wheel has exceeded the predetermined limit thereof after a predetermined amount of time after initiation of step (e); or or (iii) the deceleration of the motorcycle exceeds a maximum amount, and the slip of the rear wheel after application of a braking force thereto has exceeded the predetermined limit thereof and then returned to an acceptable value and thereafter the rear wheel has not accelerated to a predetermined value.

3. A method according to claim 2, wherein after the generation of first and second control signals, step (h) is delayed for a given period of time.

4. A method according to claim 2, wherein the braking forces applied to the front and rear brakes are applied by applying pressure thereto through respective pressure modulators.

5. A method according to claim 4, wherein, when the second control signal is generated, the brake pressure of the front brakes is reduced in accordance with a predetermined time function until the second control signal is no longer generated.

6. A method according to claim 4, wherein the second control signal is no longer generated if, in condition (i), the deceleration of the rear wheel exceeds a predetermined threshold value, if in condition (ii) the acceleration of the rear wheel exceeds a minimum threshold value, or if in condition (iii) a reduction in the pressure applied to the front brake by a predetermined amount has already taken place.

7. A method according to claim 4, wherein the front brake includes a pressure relief piston and the value of the front brake braking pressure is determined by the position of the pressure relief piston.

8. A method according to claim 4, wherein the value of the braking pressure of the front brake is stored upon the occurrence of the second control signal.

9. A method according to claim 8, wherein if the first control signal is generated and the second control signal is not generated, the front brake braking pressure is increased in accordance with a time function up to the value of the stored front wheel brake braking pressure.

10. A method according to claim 9, wherein the front brake wheel braking pressure is increased with a slight increase in pressure within the value range of the stored front brake braking pressure.

11. Apparatus for controlling the braking force of motorcycles having front and rear wheels with respective front and rear brakes, which comprises:

respective sensors for sensing the circumferential speed of the front wheel and for sensing the circumferential speed of the rear wheel;

respective means for applying a braking force to the front and rear brakes to decelerate the motorcycle;

means responsive to the sensors for determining the speed of the front wheel, the speed of the rear wheel and the deceleration of the motorcycle;

means for generating a first control signal if the deceleration of the motorcycle exceeds predetermined limits thereof;

means for determining from the speeds of the front and rear wheels whether the rear wheel has lost contact with the ground and for generating a second control signal if, after a predetermined time from application of a braking force to the front or to both front and rear brakes, the rear wheel has lost contact to the ground; and means for reducing the braking force applied to the front brakes if either the first or second control signal is generated.

12. A method of regulating the braking force of a motorcycle having front and rear wheels with respective front and rear brakes, which comprises:

(a) sensing the circumferential speeds of the front and rear wheels;

(b) applying a braking force to the front brakes or to both the front and rear brakes to decelerate the motorcycle;

(c) determining from the circumferential speeds of the front and rear wheels the speed of the front wheel, the speed of the rear wheel and the deceleration of the motorcycle;

(d) generating a first control signal if the deceleration of the motorcycle exceeds predetermined limits thereof;

(e) reducing the braking force applied to the front brakes if the first control signal is generated;

(f) determining from the speeds of the front and rear wheels whether the rear wheel has lost adherence with the ground;

(g) generating a second control signal if, after a predetermined time from initiation of step (b), the rear wheel has lost adherence to the ground as determined by any of the following conditions occurring:

(i) the deceleration of the motorcycle exceeds a predetermined maximum amount, and the speed of the rear wheel is greater by a minimum amount than the speed of the front wheel, and with no braking force applied to the brakes of the rear wheel, the deceleration of the rear wheel is less than a minimum amount; or (ii) the deceleration of the motorcycle exceeds a maximum amount and, with a braking force applied to the rear brakes, the slip of the rear wheel has exceeded the predetermined limit thereof after a predetermined amount of time after initiation of step (e); or (iii) the deceleration of the motorcycle exceeds a maximum amount, and the slip of the rear wheel after application of a braking force thereto has exceeded the predetermined limit thereof and then returned to an acceptable value and thereafter the rear wheel has not accelerated to a predetermined value;

(h) reducing the braking force applied to the front brakes if the second control signal is generated;

(i) if a braking force is applied to the rear brakes determining whether the slip of the rear wheel has exceeded a predetermined limit;

(j) determining whether there is a jitter of the front wheel, and if there is a jitter, delaying step (h) for a given period of time.

* * * * *